(12) United States Patent
Ilic

(10) Patent No.: US 12,739,261 B2
(45) Date of Patent: Sep. 15, 2026

(54) CYBER-SECURE DYNAMIC MONITORING AND DECISION SYSTEMS

(71) Applicant: Massachusetts Institute of Technology, Cambridge, MA (US)

(72) Inventor: Marija Ilic, Sudbury, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 194 days.

(21) Appl. No.: 18/576,558

(22) PCT Filed: Jul. 26, 2022

(86) PCT No.: PCT/US2022/038296
§ 371 (c)(1),
(2) Date: Jan. 4, 2024

(87) PCT Pub. No.: WO2023/009489
PCT Pub. Date: Feb. 2, 2023

(65) Prior Publication Data
US 2024/0314143 A1 Sep. 19, 2024

Related U.S. Application Data

(60) Provisional application No. 63/225,873, filed on Jul. 26, 2021.

(51) Int. Cl.

| | |
|---|---|
| ***H04L 9/40*** | (2022.01) |
| ***H02J 13/00*** | (2026.01) |
| ***H02J 13/12*** | (2026.01) |

(52) U.S. Cl.
CPC .......... *H04L 63/1416* (2013.01); *H02J 13/12* (2026.01)

(58) Field of Classification Search
CPC .............. H04L 63/1416; H04L 63/1425; H02J 13/00001; H02J 13/00002;
(Continued)

(56) References Cited

U.S. PATENT DOCUMENTS 5,483,147 A 1/1996 Ilic et al.
5,517,422 A 5/1996 Ilic et al.
(Continued)

OTHER PUBLICATIONS

Anderson et al.; "Network System Engineering for Meeting the Energy and Environmental Dream," Proceedings of the IEEE; vol. 99; No. 1; Jan. 2011; pp. 7-14 (8 pages).
(Continued)

*Primary Examiner* — Bharat Barot

(57) ABSTRACT

Systems and methods for detecting cyber attacks of subsystems include an interface of the subsystem that provides power exchange. A processor may be configured to calculate an interaction variable from a function of one or more internal states of the subsystem. A comparator circuit is coupled to receive the output signal and the interaction variable, to determine a difference between at least one characteristic of the power signal and at least one characteristic of the interaction variable. A cyber-attack identification module is configured to identify the presence of a cyber-attack targeting the system based on the difference between the at least one characteristic of the power signal and the at least one characteristic of the interaction variable.

20 Claims, 6 Drawing Sheets

(58) Field of Classification Search
CPC ...... H02J 13/00004; H02J 13/10; H02J 13/12; H02J 13/14; H02J 13/16
USPC ..................................................... 726/22–25
See application file for complete search history.

(56) References Cited

U.S. PATENT DOCUMENTS

| | | | |
|---|---|---|---|
| 5,698,968 A | 12/1997 | Takagi et al. | |
| 8,738,191 B2 | 5/2014 | Aivaliotis et al. | |
| 9,054,531 B2 | 6/2015 | Ilic et al. | |
| 9,148,019 B2 * | 9/2015 | Goldsmith | H02J 3/38 |
| 9,257,845 B2 | 2/2016 | Alonso Sadaba et al. | |
| 9,625,887 B2 | 4/2017 | Ilic et al. | |
| 10,362,056 B1 | 7/2019 | El Hariri et al. | |
| 10,623,436 B2 * | 4/2020 | Mohan | H04L 63/1441 |
| 11,283,829 B2 * | 3/2022 | Zorlular | H04L 63/1416 |
| 11,532,056 B2 * | 12/2022 | Pi | H02J 13/00002 |
| 12,547,163 B2 * | 2/2026 | Mani Iyer Ramani | G05B 23/0221 |
| 2004/0215348 A1 | 10/2004 | Ilic et al. | |
| 2008/0143304 A1 | 6/2008 | Bose et al. | |
| 2010/0049455 A1 | 2/2010 | Scholtz et al. | |
| 2012/0013322 A1 | 1/2012 | Dearborn | |
| 2012/0083930 A1 | 4/2012 | Ilic et al. | |
| 2012/0101640 A1 | 4/2012 | Stapelfeldt | |
| 2012/0259477 A1 | 10/2012 | Abido et al. | |
| 2013/0166084 A1 | 6/2013 | Sedighy et al. | |
| 2014/0200722 A1 | 7/2014 | Bhavaraju | |
| 2014/0249686 A1 | 9/2014 | Brainard et al. | |
| 2014/0343984 A1 | 11/2014 | Shahabi et al. | |
| 2014/0371940 A1 | 12/2014 | Ilic et al. | |
| 2015/0039145 A1 | 2/2015 | Yang et al. | |
| 2015/0162750 A1 | 6/2015 | Varma | |
| 2015/0289785 A1 | 10/2015 | Bojovic et al. | |
| 2015/0346751 A1 | 12/2015 | Hou | |
| 2016/0042377 A1 | 2/2016 | Ilic et al. | |
| 2016/0147244 A1 * | 5/2016 | Momoh | H02J 3/381 700/297 |
| 2016/0329713 A1 | 11/2016 | Berard | |
| 2016/0373025 A1 | 12/2016 | Mascioli et al. | |
| 2017/0322578 A1 | 11/2017 | Baone | |
| 2018/0082385 A1 | 3/2018 | Frolik et al. | |
| 2018/0083549 A1 | 3/2018 | Yao et al. | |
| 2019/0271998 A1 | 9/2019 | Sisson et al. | |
| 2021/0112090 A1 * | 4/2021 | Rivera | H04L 63/1425 |

OTHER PUBLICATIONS

ARPA-E, "Network Optimized Distributed Energy Systems (NODES);" Retrieved from https://arpa-e.energy.gov/?q=arpa-e-programs/nodes; Released Dec. 11, 2015; 1 Page.
Donadee, "Operation and Valuation of Multi-Function Battery Energy Storage under Uncertainty;" PhD Dissertation at Carnegie Mellon University; May 2015; 169 Pages.
Holmberg, D., Burns, M., Bushby, S., McDermott, T., Tang, Y., Huang, Q., Pratt, A., Ruth, M., Bichpuriya, Y., Rajagopal, N. and Ilic, M., 2019. NIST Transactive Energy Modeling and Simulation Challenge Phase II Final Report. NIST special publication., May 2019; 147 pages.
Ilic et al., "Dynamic Monitoring and Decision Systems (DYMONDS) Framework for Reliable and Efficient Congestion Management in Smart Distribution Grids;" In Bulk Power System Dynamics and Control—IX Optimization, Security and Control of the Emerging Power Grid (IREP); 2013 IREP Symposium; Aug. 25, 2013; 9 Pages.
Ilic et al., "Power Exchange for Frequency Control (PXFC);" Proceedings of the IEEE PES Winter Meeting; Jan. 1999; 11 Pages.
Ilic et al., "Toward Multi-Layered MPC for Complex Electric Energy Systems" Chapter in The Handbook of Model Predictive Control; Sep. 2018; pp. 625-663; 39 Pages.
Ilic, "Toward a Unified Modeling and Control for Sustainable and Resilient Electric Energy Systems;" Foundations and Trends® in Electric Energy Systems; Dec. 22, 2016; 146 Pages.
Ilić, M. D., & Jaddivada, R. (2018). Multi-layered interactive energy space modeling for near-optimal electrification of terrestrial, shipboard and aircraft systems. Annual Reviews in Control, 45, 52-75., 2018; 32 pages.
Ilić, M., & Jaddivada, R. (Sep. 2019). Toward technically feasible and economically efficient integration of distributed energy resources; 2019 57th Annual Allerton Conference on Communication, Control, and Computing (Allerton) (pp. 796-803). IEEE., Sep. 2019; 8 pages.
International Preliminary Report on Patentability dated Jun. 11, 2020 for International Application No. PCT/US2018/063239; 15 Pages.
International Preliminary Report on Patentability dated Nov. 7, 2019 for International Application No. PCT/US2018/030042; 8 pages.
Jaddivada et al., "A Distribution Management System for Implementing Synthetic Regulation Reserve;" 2017 North American Power Symposium (NAPS); Sep. 2017; 7 Pages.
Jevtic et al, "Physics- and Learning-based Detection and Localization of False Data Injections in Automatic Generation Control," CPES, Dec. 2018; 6 pages.
Joo et al., "Multi-Layered Optimization of Demand Resources Using Lagrange Dual Decomposition;" IEEE Transactions on Smart Grid, vol. 4, No. 4; Dec. 2013; 8 Pages.
Liu et al., "Droop Control with Improved Disturbance Adaption for PV System with Two Power Conversion Stages;" IEEE Transactions on Industrial Electronics, vol. 63, No. 10; May 4, 2016; 15 Pages.
Miao et al., "Distributed Model Predictive Control of Synchronous Machines for Stabilizing Microgrids;" 2017 North American Power Symposium (NAPS); Sep. 17, 2017; 6 Pages.
Miller et al., "Impact of Frequency Responsive Wind Plant Controls on Grid Performance;" GE Energy Article; 2011 IEEE Power and Energy Society General Meeting; Jul. 24, 2011; 8 Pages.
Miller et al., "Impact of Frequency Responsive Wind Plant Controls on Grid Performance;" GE Energy Presentation; Dec. 20, 2010; 10 Pages.
PCT International Search Report and Written Opinion dated Feb. 5, 2019 for International Application No. PCT/US2018/063239; 20 Pages.
PCT International Search Report and Written Opinion dated Jul. 20, 2018 for International Application No. PCT/US2018/030042; 10 Pages.
PCT International Search Report and Written Opinion dated Nov. 29, 2022 for International Application No. PCT/US2022/38296; 8 Pages.
Popli et al., "Enabling Convex Energy Bids for Flexible Ramp Product via Smart Local Automation;" International Federation of Automatic Control (IFAC) Conference Paper; IFAC-PapersOnLine 48-30; pp. 245-250; Jan. 2015; 6 Pages.
Woyke, "A Smarter Smart City;" MIT Technology Review; Retrieved from https://www.technologyreview.com/s/610249/a-smarter-smart-city/: Feb. 21, 2018; 12 Pages.
Xu et al., "Modeling of Electric Water Heaters for Demand Response: A Baseline PDE Model;" IEEE Transactions on Smart Grid, vol. 5, No. 5; Sep. 2014; 8 Pages.

* cited by examiner

CYBER-SECURE DYNAMIC MONITORING AND DECISION SYSTEMS

CROSS REFERENCE TO RELATED APPLICATIONS

This application is a 371 National Stage Entry of International Patent Application PCT/US2022/038296 filed in the English language on Jul. 26, 2022, which claims the benefit of U.S. Provisional Application 63/225,873 filed on Jul. 26, 2021, which applications are hereby incorporated by reference in their entireties.

STATEMENT REGARDING FEDERALLY SPONSORED RESEARCH OR DEVELOPMENT

This invention was made with government support under ECCS2002570 awarded by the National Science Foundation and DE-EE0009031 awarded by the U.S. Department of Energy. The government has certain rights in the invention.

BACKGROUND

Modern power system and subsystems include not only grid-level power applications, but also more localized applications such as localized subsystems, microgrids, and the like. These subsystems may manage and provide power to a relatively localized area such as a town, a campus, a factory or group of factories, a home, etc.

Such subsystems may include power sources including, but not limited to traditional power plants (e.g., coal fire or nuclear power plants), solar farms and panels, wind farms and turbines, generators. Power subsystems may also include various types of loads such as residential domiciles, factories, electric vehicles, and the like. In addition, these power subsystems may also include power storage devices (also sometimes referred to herein as storage elements) such as batteries. Other elements and circuits may be present within the subsystem such as power switches, power converters, power buses, and the like. All these elements may interact within the subsystem to create a localized power ecosystem or "grid" that provides energy to energy consumer (i.e. loads) within the subsystem.

Many subsystems include computerized management systems that monitor and/or control the power sources, loads, storage elements (e.g., batteries), and other elements. These management systems can be susceptible to cyber-attacks, i.e. attacks by "hackers" (i.e., an organization or person who utilizes processing or other devices (e.g., computers) to gain unauthorized access to systems, data, and/or operations of a system) or other parties intending to interrupt, disrupt or otherwise interfere with or change in some way operation of a management system or a subsystem. Detecting cyber-attacks can afford a person, system or organization under attack to defend against the cyber-attack.

For example, a cyber-attack may be directed toward information regarding a tie-line exchange or frequency input to an automatic generation control (AGC). In an electric power system, an AGC is a system for adjusting the power output of multiple generators at different power plants, in response to changes in the load. One AGC function is to automatically control power generation in response to slow, hard-to-predict area control imbalances. Each control area may have its own AGC system, with the task of regulating local area frequency to nominal value (60 Hz in USA, for example), and the exchange of power with the neighboring areas. The net power imbalance between neighboring areas is represented as the Area Control Error (ACE).

SUMMARY

Some or all of the actions described below may be performed by a computer or processor executing software instructions, by hardware, or by a combination of a computer or processor executing software instructions and hardware.

In an embodiment, a system includes an interface that provides an output signal; a controller configured to calculate an interaction variable from a function of one or more internal states of the system; a comparator circuit coupled to receive the output signal and the interaction variable, to determine a difference between at least one characteristic of the power signal and at least one characteristic of the interaction variable; and a cyber-attack identification module configured to identify the presence of a cyber-attack targeting the system based on the difference between the at least one characteristic of the power signal and the at least one characteristic of the interaction variable.

Implementations may include one or more of the following features. The system may be a microgrid. The output signal is a power output signal of the microgrid. The microgrid is a hierarchical microgrid. The interaction variable is a function that includes a rate of change of reactive power of the output signal. The interaction variable is a function of internal states of the system. The internal states may include: an amount of power generated by the system, an amount of power provided as an output of the system, an amount of power received from other systems, a change in a power level of the system, or any combination thereof. The cyber attack identification module calculates a threshold of the difference, and compares the difference to the threshold. The system includes one or more power source elements and one or more load elements. The system may include at least one measurement circuit to measure a state of the one or more power source elements and/or the one or more load elements.

In another embodiment, a method of detecting a cyber-attack of a system includes providing, by the system, an output signal; measuring one or more internal states of the system; calculating an interaction variable from a function of one or more internal states of the system; determining, by a comparator circuit coupled to receive the output signal and the interaction variable, a difference between at least one characteristic of the power signal and at least one characteristic of the interaction variable; and identifying, by a cyber-attack identification module, the presence of a cyber-attack targeting the system based on the difference between the at least one characteristic of the power signal and the at least one characteristic of the interaction variable.

Implementations may include one or more of the following features. The system is a microgrid. The output signal is a power output signal of the microgrid. The microgrid is a hierarchical microgrid. The interaction variable is a function that includes a rate of change of reactive power of the output signal. The interaction variable is a function of internal states of the system. The internal states may include: an amount of power generated by the system, an amount of power provided as an output of the system, an amount of power received from other systems, a change in a power level of the system, or any combination thereof. The cyber attack identification module calculates a threshold of the difference, and compares the difference to the threshold. The system includes one or more power source elements and one or more load elements. The method may include measuring, by at least one measurement circuit, a state of the one or more power source elements and/or the one or more load elements.

DETAILED DESCRIPTION

In general overview, described herein are systems and methods for detecting cyber-attacks. Also described are systems and methods for defending against cyber-attacks. It should be appreciated that although references and examples are sometimes made herein to systems and methods for detecting cyber-attacks in the context of electrical power systems, such references the concepts, systems and methods described herein may also find use is in a variety of other applications such as computer systems and computer network applications.

Before describing the details of systems and methods for detecting and defending against cyber-attacks some introductory terminology is explained. The term "subsystems" is used herein to refer to electrical power subsystems. It should be appreciated that this term may include various types of subsystems such as power grids, power grid subsystems, microgrids, building-level power systems, or any other type of power system with power generating elements, power consuming elements, and/or power storage elements. In some instances, subsystems will include computerized monitoring or control of some or all the elements within the subsystem. For example, a computing system may monitor and control power sources within the subsystem by measuring voltage and current outputs of the power source and throttling the electrical output of the power source. The computing system may also monitor and control power consumer (a.k.a. loads) by measuring the current into and voltage across the load, and turning the loads on and off and/or throttling the amount of power the load consumes. The computing system may also monitor and control batteries within the subsystem by measuring the stored energy within the battery and controlling the charging and discharging of the battery.

Subsystems with emerging functionalities may require cyber-physical control for their lead services. These subsystems can participate in economic dispatch to predict usage and balance ancillary services. Cyber-attacks can compromise the subsystem and potentially cause significant operational problems.

Figure 1:
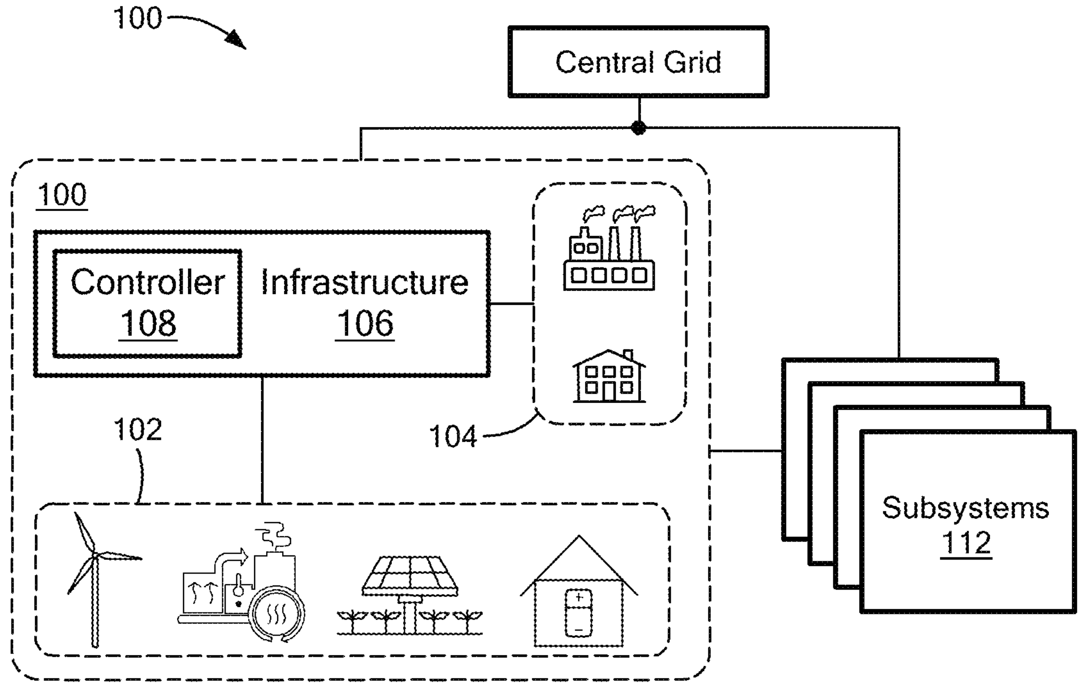
FIG. 1 is block diagram of an example power system comprising one or more subsystems.

Referring to FIG. 1, a subsystem 100 is coupled to a central power grid 102. The subsystem 100 may include various power sources 102 which may include any elements that generate power within the subsystem 100. Examples of sources 102 include, but are not limited to, power generators, power plants, solar farms, wind farms, storage devices and the like. The power sources 102 may also include one or more solar panels on buildings.

The subsystem 100 may also include various loads 104, which may include any element that consumes power such as buildings, factories, residential homes, and the like as well as any power consuming machines therein. For example, loads 104 may also include loads within buildings and structures such as heating systems, hot water heaters, air conditioning systems, and the like. Subsystem 100 may also include elements that can act as both electrical sources and loads, such as storage devices (e.g., batteries). One or more loads 104 may be critical loads, which may be loads where power must not be interrupted. Examples of critical loads include hospitals and other facilities where the loss of power can be dangerous. Subsystem 104 may also comprise one or more priority loads and/or one or more interruptible loads. Priority loads are loads where it is desirable to provide continuous power, and interruptible loads are loads where temporary loss of power may be acceptable.

The subsystem also includes infrastructure 106, which may comprise power lines, switches, buses, transformers, communication lines, and other electrical circuits and interconnections that allow the sources 102 and loads 104 to interact, provide/consume power, and communicate with each other. In some instances, the infrastructure 106 may include a computer network (wired or wireless) that allows communication between some or all of the elements within the subsystem 100.

The infrastructure 106 may include a controller 108 coupled to one, some, or all the sources 102, loads 104, infrastructure 106 elements, or any other element within subsystem 100. In embodiments, controller 108 may be a computing device that includes a processor and a memory. The processor may execute software instructions stored on the memory, which may cause the processor to perform various functions. These functions may include operational functions of the subsystem such as controlling any or all the loads 104, sources 102, infrastructure elements, or storage devices. The functions may also include any or all the functions described below relating to detection of a cyber attack including, but not limited to, measuring or computing interaction variables (IntVars), comparing IntVars to detect a cyber attack, and the like.

Controller 108 may be a single computing device 108 or a plurality of computing devices. Controller 108 may be collocated with subsystem 100, or may be located at a remote location as long as controller 108 can communicate with one or more of the element(s) within subsystem 100.

Subsystem 100 may be coupled to a central grid 110, such as a national or regional power grid. Similarly, subsystem 100 may be coupled to one or more other subsystems 112. In some instances, there may be power exchange between subsystem 100 and central grid 110. However, in other instances, subsystem 100 may operate independently, supplying and consuming its own power without the need for power exchange with other grids.

Figure 2:
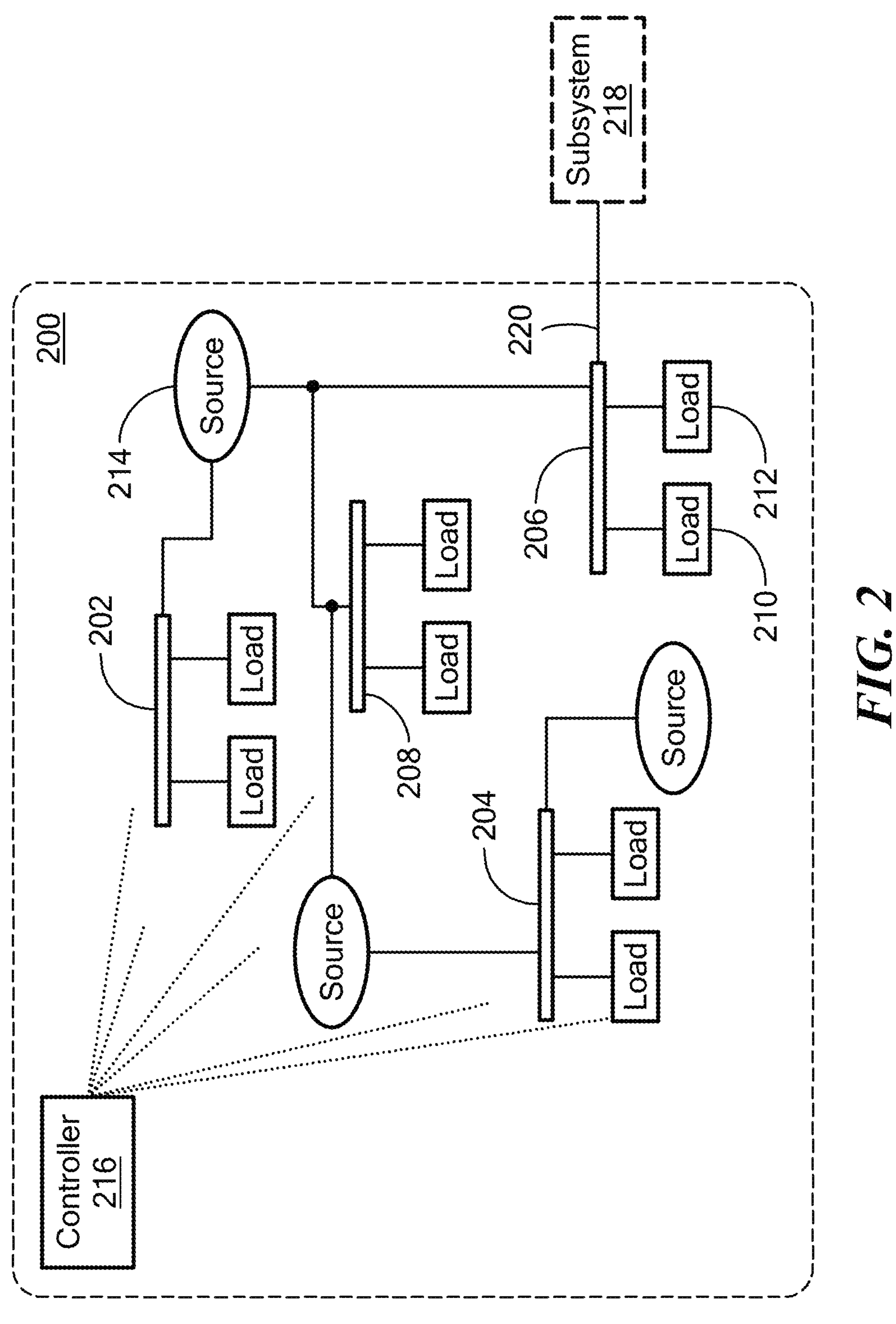
FIG. 2 is block diagram of an example power system comprising an aggregator/controller coupled to one or more sources, loads and/or buses.

Referring to FIG. 2, subsystem 200 may be the same as or similar to subsystem 100. In this example, additional examples of subsystem infrastructure are shown. Subsystem 200 is shown with various points of contact 202, 204, 206, 208. These points of contact 202-208 may act as electrical buses that can function as interconnects for various loads and sources within or external to subsystem 200. For example, point of contact 206 may be coupled to loads 210 and 212, and coupled to source 214 which may provide power to loads 21 and 212. Point of contact 206 may also provide an external interface point to subsystem 200, which may be coupled to a central grid, another subsystem 218, or the like. In embodiments, subsystem 200 may have multiple external interfaces that exchange power with multiple other subsystems.

A controller 216 may be coupled to one, some, or all the elements within subsystem 200. Controller 216 may monitor and/or control the infrastructure elements, providing power to critical loads, priority loads, and interruptible loads as needed. Controller 216 may also measure or otherwise determine or receive the state of each element within subsystem 200 and use one, some or all of the element states to generate an aggregated IntVar calculation, which will be discussed below.

An IntVar of subsystem 200 may be represented as the power exerted by subsystem 200 on its environment. One way to measure the IntVar is to measure an area control error (ACE), which can be represented as power and the rate of change of the power at the external interfaces (e.g. interface 220) of subsystem 200. If the subsystem has more than one external interface (i.e. more than one point of contact that exchanges power external to subsystem 200), then the IntVar for subsystem 200 can be measured by measuring the power exchange (e.g. the power input or output, and/or the rate of change of the power input or output) at each interface and summing them.

$$IntVar_{Subsystem} = \sum IntVar_{Interfaces} \tag{1}$$

Another way to measure the IntVar of subsystem 200 is to calculate, computer, receive or otherwise determine the internal states of subsystem 200. This may be accomplished, for example, by measuring the power and the rate of change of power of every element (i.e., loads, sources, power storage elements, etc.) within subsystem 200 and aggregating them. Thus, the IntVar can be calculated or otherwise determined as a function of the internal states of the subsystem, and can be represented as, where x is an internal state of subsystem 200:

$$IntVar_{Subsystem} = \sum IntVar_{Elements} = \sum x, \dot{x} \tag{2}$$

Since the internal state x and the rate of change of the internal state are measured, the IntVar of the subsystem can be viewed as a function of the internal states x and the rate of change of the internal states $\dot{x}$ of the subsystem $f(x, \dot{x})$. In view of equations (1) and (2), in a normally operating subsystem:

$$\sum IntVar_{Interfaces} - \sum IntVar_{Elements} = 0 \tag{3}$$

The left side of equation (3) represents the IntVar measured at the subsystem's external interfaces. The right side of equation (3) represents the IntVar calculated aggregating the states of the elements within the subsystem. If there is a discrepancy, for example if the two sides of equation (3) do not match, it can indicate the presence of a cyber-attack that is affecting the power generated and/or consumed by the subsystem.

To detect the presence of a cyber-attack, a threshold value T (e.g., a determined value, or an arbitrarily selected threshold value T) may be established, such that if:

$$\left|\sum IntVar_{Interfaces} - \sum IntVar_{Elements}\right| > T \tag{4}$$

then a cyber-attack is detected.

In embodiments, a threshold value may be determined based upon historical data associated with one or more systems and/or subsystems.

In embodiments, controller 216 may be coupled to each element within subsystem 200 and can measure the power input and output of each element. Additionally or alternatively, controller 200 may receive communications about the state of each element within subsystem 200. For example, controller 216 may receive a network communication from an element such as a smart water heater within subsystem 200 providing information about the power consumption of the smart water heater. Controller 216 may then be able to calculate and aggregate the IntVar of the subsystem by aggregating the power input and output of each element within the subsystem, per equation (2) above.

Figure 3:
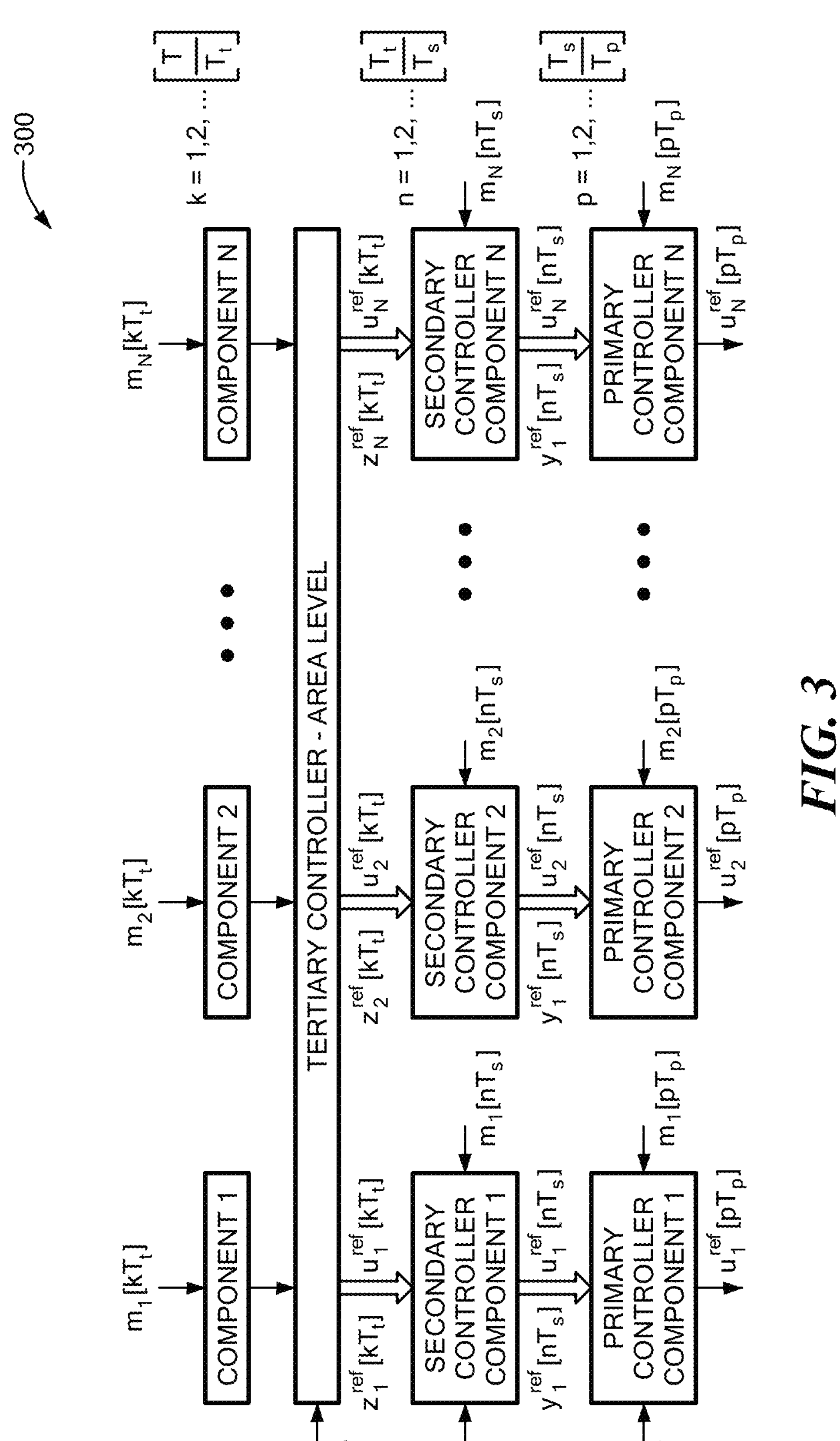
FIG. 3 is a block diagram representation of information processing in emerging microgrids showing their hierarchical control.

Referring to FIG. 3, some subsystems may operate according to a hierarchical control structure 300 having a plurality of levels with here three levels being shown (i.e., primary, secondary and tertiary levels being shown in the example embodiment of FIG. 3). Each of the levels may comprise one or more controllers and/or one or more components. At each level, decisions are made and scales of complexity differ at the primary, secondary and tertiary levels. The one or more controllers in the bottom level (identified as Row C in FIG. 3) may represent one or more controllers coupled to one or more individual elements within a subsystem, such as a controller coupled to one or more of: an individual load such as a smart water heater or electric car; to an individual source such as generator; and/or to an individual storage device, or the like. The one or more controllers in Row B may represent controllers that operate a subsystem, such as controller 216 in FIG. 2. The controllers in rows B and C may communicate with each other, providing and/or exchanging information (for example over a communication network) about the state of the subsystem and/or the state of the elements within the subsystem.

A tertiary level controller in row A may communicate with multiple subsystem-level controllers in row B. In embodiments, the tertiary controller in row B may provide and/or exchange information about the amount of power that is being exchanged between subsystems. For example, referring again to FIG. 2, the tertiary controller can provide information to controller 216 and/or subsystem 218 about the ACE between subsystems 200 and 218. In FIG. 3, the boxes labeled component 1 through N may represent energy generating sources including but not limited to entire power plants such as solar plants, nuclear power plants, fusion power plants, storage devices, generators, and the like.

Figure 4:
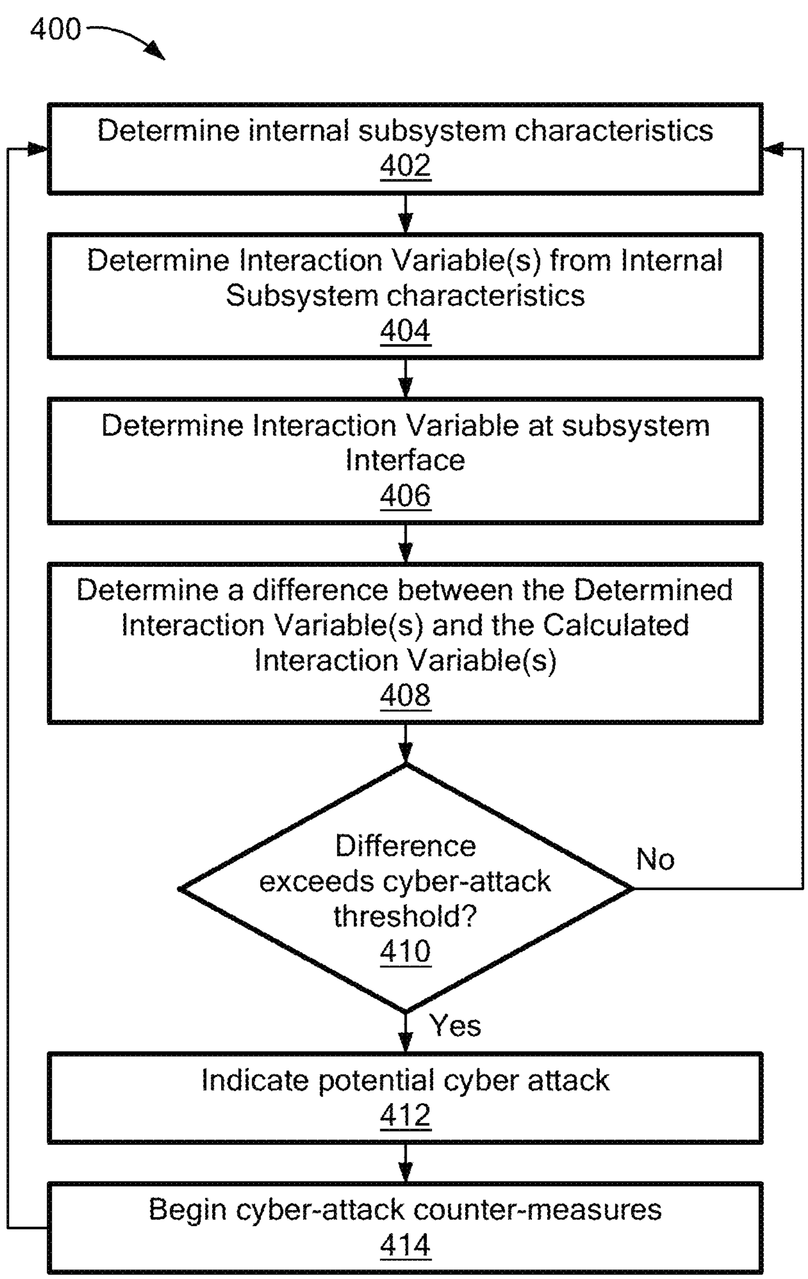
FIG. 4 is a flow diagram of a process for detecting a cyber attack.

FIG. 4 is a flow diagram showing illustrative processing for detecting a cyber-attack in a subsystem that can be implemented within any of systems 100 (FIG. 1), 200 (FIG. 2), 300 (FIG. 3) describe above. Some or all of the functions in the flowchart may be performed by a computing device, such as controller 216 (FIG. 2).

Rectangular elements (typified by element 402 in FIG. 4), denoted as "processing blocks," represent processing or computer software instructions or groups of instructions. Diamond shaped elements (typified by element 410 in FIG.

4), denoted as "decision blocks," represent processing or computer software instructions, or groups of instructions, which affect the execution of the processing or computer software instructions represented by the processing blocks. Alternatively, the processing and decision blocks may represent functions performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular system or device. It should be noted that many routine program elements, such as initialization of loops and variables and the use of temporary variables are not shown. It will be appreciated by those of ordinary skill in the art that unless otherwise indicated, the particular sequence of blocks described is illustrative only and can be varied without departing from the spirit of the concepts, structures, and techniques described. Thus, unless otherwise stated the blocks described below are unordered meaning that, when possible, the functions represented by the blocks can be performed in any convenient or desirable order.

Turning now to FIG. 4, processing begins in processing block 402, internal characteristics (e.g., internal states) of a subsystem are measured or otherwise determined. As described above, in embodiments, the internal states of elements within a subsystem can be measured otherwise determined by or communicated to a controller. In processing block 404, an IntVar for the subsystem is calculated or otherwise determined from the characteristics that were measured in processing block 402. The measured or determined characteristics can be aggregated. In embodiments, the measured or determined characteristics can be aggregated according to equation (2) above. In processing block 406, the IntVar of the subsystem can be measured or otherwise determined by measuring or determining the power exchange at the interface(s) of the subsystem. This may be accomplished, for example, according to equation (1) above.

In box 408, the controller may calculate or otherwise determine a difference between the value of the IntVar that was determined in box 406 and the value of the IntVar that was determined in processing block 404. If that difference exceeds a threshold in box 410, then the controller may indicate that a potential cyber attack was detected in processing block 412. In processing block 414, measures/processes/actions to counter the cyber-attack can be taken. These measures can include any known cyber-attack counter measures such as shutting off external network communications, closing firewalls, and the like.

If, in decision block 410, the difference did not exceed the threshold value, the controller may restart the process at processing block 402. In embodiments, the process 400 may take a few seconds or less to execute. Thus, the concepts, systems and techniques described herein may rapidly determine a potential cyber attack.

Figure 5:
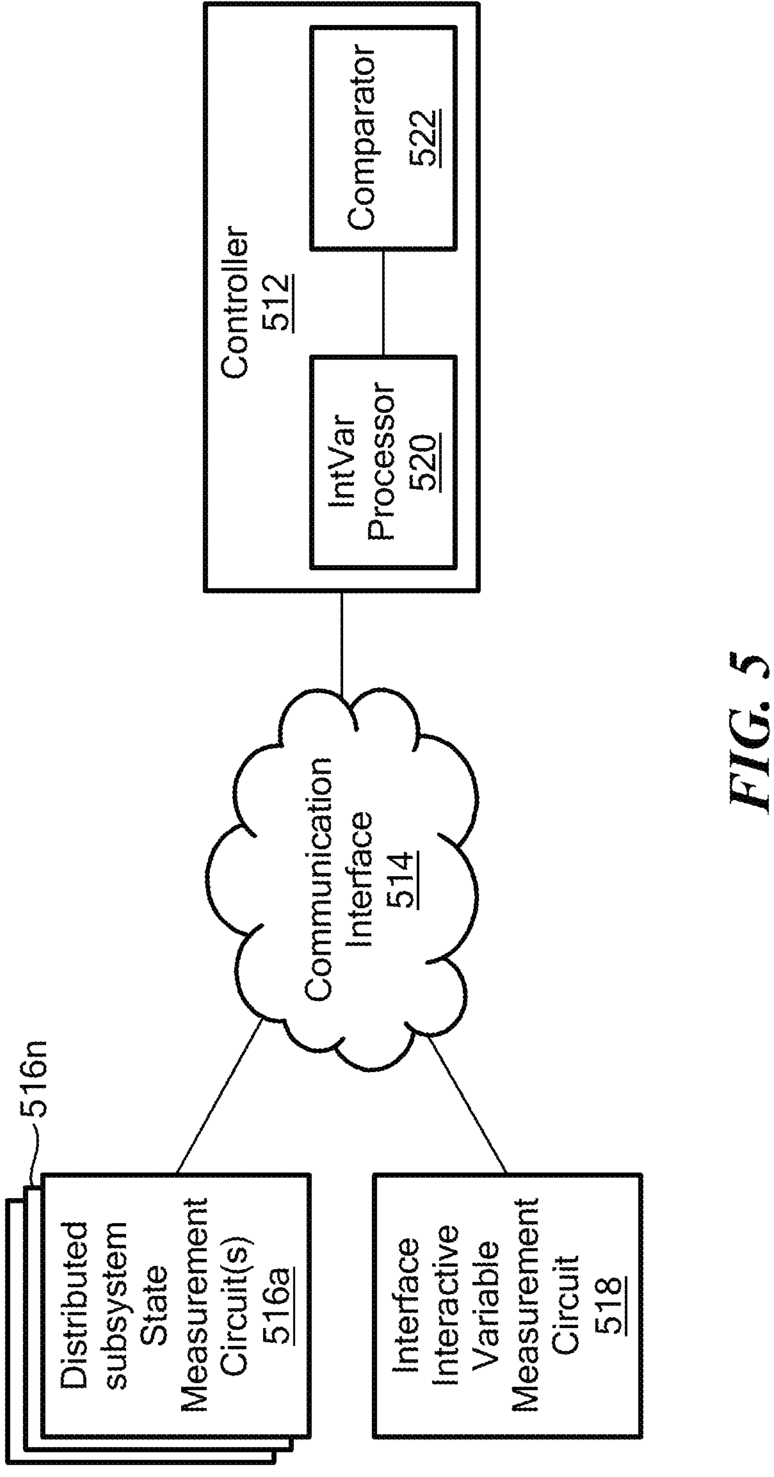
FIG. 5 is a block diagram of a system for detecting a cyber attack.

Referring to FIG. 5, a system 500 for detecting or otherwise determining a cyber-attack includes a controller 502 that may be associated with a subsystem. Controller 502 may be the same as or similar to controller 216. The system may include one or more distributed system state measurements circuits 516*a-n*. These circuits 516*a-n* may function or otherwise act to measure or determine the internal state of the subsystem by, for example, measuring the state of the elements of the subsystem. For example, the circuit 516*a-n* may comprise a power measurement device capable of measuring how much power is being consumed by an individual load within the subsystem, or how much power is being produced by an individual source within the subsystem.

The system may also include one or more interface IntVar measurement circuits 518. The circuit 518 may be configured to measure power at the interface of the subsystem to determine a value of the IntVar for the subsystem. For example, circuit 518 may determine (e.g., measure) an ACE between subsystems, the net power exchange of the subsystem at all external interfaces, and/or similar measurements.

The circuits 516*a-n* and 518 may communicate with the controller 512 through a communication interface 514, which may be a wireless or wired network. An IntVar processor module 520 may receive the measurements of the internal states of the subsystem from the circuits 516*a-n* and compute a first value of the IntVar of the system from the internal states. The IntVar processor module 520 may also receive the measurements of power at the external interfaces of the subsystem from circuit 518 and use them to compute a second value of the IntVar of the system. A comparator module 522 may compare the first value of the IntVar with the second value of the IntVar. Under normal operating conditions, the two values should be substantially the same. Thus, if the difference between the two values is above a threshold, controller 512 may provide an indication of the presence of a cyber attack.

Figure 6:
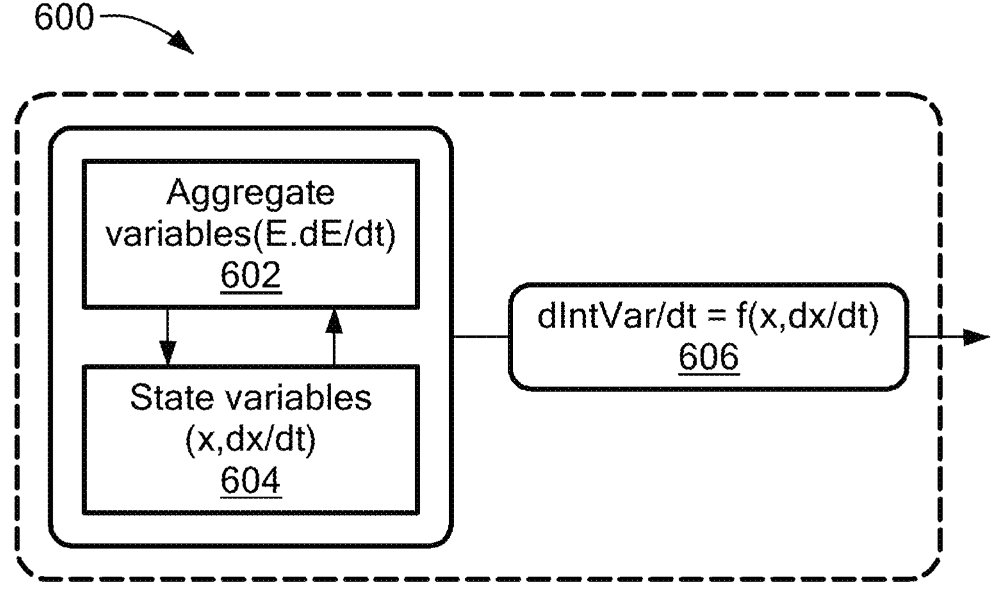
FIG. 6 is a model of subsystem.

Referring to FIG. 6, an example model 600 of an example subsystem is shown. Box 602 represents the aggregate of the measurements at the external interfaces of the subsystem. These are represented as the power exchange at the external interface E and the rate of change of the power exchange at the external interface dE/dt. Box 604 represents the internal states x and the rate of change of the internal states dx/dt of the elements of the subsystem. Under normal operating conditions, the values boxes 602 and 604 should be substantially the same. Also, the rate of change of the value of these boxes should be substantially the same.

From these measurements, the IntVar and the rate of change of the IntVar (dIntVar/dt) can be calculated. As shown in box 606, the rate of change of the IntVar and/or dt the rate of change of the IntVar are a function of the state variables x and the rate of change of the state variables dx/dt.

Figure 7:
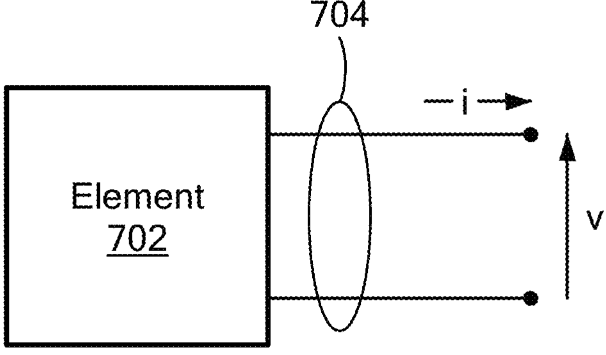
FIG. 7 is a model of an element of a subsystem.

Referring to FIG. 7, a model of an element 702 is shown to illustrate example measurements of state variables and IntVar calculations for the element. The element 702 is a generalized element that can represent a subsystem or an element within a subsystem. The element 702 has a terminal 704. Power can be measured at the terminal, for example, by measuring the current i and voltage V. The state variables may be the power P at the terminal (where P=I*V) and the rate of change of the power at the terminal where:

$$\frac{dInt\mathrm{Var}}{dt} = \begin{cases} P = Vi \\ \frac{dQ}{dt} = V\frac{di}{dt} - i\frac{dV}{dt} \end{cases} = f\left(x, \frac{dx}{dt}\right)$$

Various embodiments of the concepts, systems, devices, structures, and techniques sought to be protected are described above with reference to the related drawings. Alternative embodiments can be devised without departing from the scope of the concepts, systems, devices, structures, and techniques described. It is noted that various connections and positional relationships (e.g., over, below, adjacent, etc.) may be used to describe elements in the description and drawing. These connections and/or positional relationships, unless specified otherwise, can be direct or indirect, and the described concepts, systems, devices, structures, and techniques are not intended to be limiting in this respect. Accordingly, a coupling of entities can refer to either a direct or an indirect coupling, and a positional relationship between entities can be a direct or indirect positional relationship.

As an example of an indirect positional relationship, positioning element "A" over element "B" can include situations in which one or more intermediate elements (e.g., element "C") is between elements "A" and elements "B" as long as the relevant characteristics and functionalities of elements "A" and "B" are not substantially changed by the intermediate element(s).

Also, the following definitions and abbreviations are to be used for the interpretation of the claims and the specification. The terms "comprise," "comprises," "comprising," "include," "includes," "including," "has," "having," "contains" or "containing," or any other variation are intended to cover a non-exclusive inclusion. For example, an apparatus, a method, a composition, a mixture or an article, that comprises a list of elements is not necessarily limited to only those elements but can include other elements not expressly listed or inherent to such apparatus, method, composition, mixture, or article.

Additionally, the term "exemplary" is means "serving as an example, instance, or illustration. Any embodiment or design described as "exemplary" is not necessarily to be construed as preferred or advantageous over other embodiments or designs. The terms "one or more" and "at least one" indicate any integer number greater than or equal to one, i.e. one, two, three, four, etc. The term "plurality" indicates any integer number greater than one. The term "connection" can include an indirect "connection" and a direct "connection".

References in the specification to "embodiments," "one embodiment, "an embodiment," "an example embodiment," "an example," "an instance," "an aspect," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it may affect such feature, structure, or characteristic in other embodiments whether or not explicitly described.

Relative or positional terms including, but not limited to, the terms "upper," "lower," "right," "left," "vertical," "horizontal, "top," "bottom," and derivatives of those terms relate to the described structures and methods as oriented in the drawing figures. The terms "overlying," "atop," "on top, "positioned on" or "positioned atop" mean that a first element, such as a first structure, is present on a second element, such as a second structure, where intervening elements such as an interface structure can be present between the first element and the second element. The term "direct contact" means that a first element, such as a first structure, and a second element, such as a second structure, are connected without any intermediary elements.

Use of ordinal terms such as "first," "second," "third," etc., in the claims to modify a claim element does not by itself connote any priority, precedence, or order of one claim element over another, or a temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value. The term "substantially equal" may be used to refer to values that are within ±20% of one another in some embodiments, within ±10% of one another in some embodiments, within ±5% of one another in some embodiments, and yet within ±2% of one another in some embodiments.

The term "substantially" may be used to refer to values that are within ±20% of a comparative measure in some embodiments, within ±10% in some embodiments, within ±5% in some embodiments, and yet within ±2% in some embodiments. For example, a first direction that is "substantially" perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

The disclosed subject matter is not limited in its application to the details of construction and to the arrangements of the components set forth in the following description or illustrated in the drawings. The disclosed subject matter is capable of other embodiments and of being practiced and carried out in various ways.

Also, the phraseology and terminology used in this patent are for the purpose of description and should not be regarded as limiting. As such, the conception upon which this disclosure is based may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, the present disclosure has been made only by way of example. Thus, numerous changes in the details of implementation of the disclosed subject matter may be made without departing from the spirit and scope of the disclosed subject matter.

Accordingly, the scope of this patent should not be limited to the described implementations but rather should be limited only by the spirit and scope of the following claims.

All publications and references cited in this patent are expressly incorporated by reference in their entirety.

What is claimed is:

1. A system comprising:

an external interface at which a power output signal is provided;

a controller configured to determine an interaction variable as a function of one or more internal states of the system;

a comparator circuit coupled to receive the power output signal from the external interface and the interaction variable from the controller, to determine a difference between at least one characteristic of the power output signal from the external interface and at least one characteristic of the interaction variable from the controller; and one or more processors configured to receive the determined difference and in response thereto to determine whether a cyber-attack is present.

2. The system of claim 1 wherein the system is a microgrid.

3. The system of claim 2 wherein the power output signal is a power output signal of the microgrid.

4. The system of claim 2 wherein the microgrid is a hierarchical microgrid.

5. The system of claim 1 wherein the interaction variable is calculated as a function that includes a rate of change of reactive power of the power output signal.

6. The system of claim 1 wherein the internal states comprise:

an amount of power generated by the system;

an amount of power provided as an output of the system;

an amount of power received from other systems;

a change in a power level of the system;

or any combination thereof.

7. The system of claim 1 wherein the one or more processors are configured to calculate a threshold value and to compare the determined difference to the threshold value to determine whether the cyber-attack is present.

8. The system of claim 7 wherein the threshold value is calculated based upon historical data associated with the system.

9. The system of claim 1 wherein the system further comprises one or more power source elements coupled to the controller and one or more load elements coupled to the controller.

10. The system of claim 9 comprising at least one measurement circuit coupled to the one or more power source elements and/or the one or more load elements, wherein the at least one measurement circuit is configured to measure a state of the one or more power source elements and/or the one or more load elements.

11. A method of detecting a cyber-attack on a system, the method comprising:

providing, by the system, a power output signal from an external interface;

measuring one or more internal states of the system;

determining, by a controller, an interaction variable as a function of one or more internal states of the system;

determining, by a comparator circuit coupled to receive the power output signal from the external interface and the interaction variable from the controller, a difference between at least one characteristic of the power output signal from the external interface and at least one characteristic of the interaction variable from the controller; and determining, by one or more processors, whether a cyber-attack is present based on the determined difference.

12. The method of claim 11 wherein the system is a microgrid.

13. The method of claim 12 wherein the power output signal is a power output signal of the microgrid.

14. The method of claim 12 wherein the microgrid is a hierarchical microgrid.

15. The method of claim 11 wherein the interaction variable is calculated as a function that includes a rate of change of reactive power of the power output signal.

16. The method of claim 11 wherein the internal states comprise:

an amount of power generated by the system;

an amount of power provided as an output of the system;

an amount of power received from other systems;

a change in a power level of the system;

or any combination thereof.

17. The method of claim 11 further comprising calculating, by the one or more processors, a threshold value, and comparing the determined difference to the threshold value to determine whether the cyber-attack is present.

18. The method of claim 17 wherein calculating the threshold value further comprises analyzing historical data associated with the system.

19. The method of claim 11 wherein the system further comprises one or more power source elements coupled to the controller and one or more load elements coupled to the controller.

20. The method of claim 19 further comprising measuring, by at least one measurement circuit coupled to the one or more power source elements and/or the one or more load elements, a state of the one or more power source elements and/or the one or more load elements.

* * * * *